United States Patent [19]

Kuroda et al.

[11] Patent Number: 5,348,080
[45] Date of Patent: Sep. 20, 1994

[54] LATENT HEAT STORAGE APPARATUS AND LATENT HEAT STORAGE SOLUTION THEREFOR

[75] Inventors: Syoichi Kuroda; Soichiro Shibata; Nonyuki Shimamura, all of Tokyo; Shigetake Kawasaki, Isehara; Keisuke Kasahara, Tokyo; Seiichi Sakuma, Tokyo; Fujio Komatsu, Tokyo; Masaya Ishikawa, Tokyo; Kunio Sugiyama, Tokyo; Mitsuo Mashimo, Tokyo; Yuzuru Shindo, Tokyo; Kuniaki Kawamura, Ibaragi, all of Japan

[73] Assignees: Tokyo Electric Power Company; Maekawa Mfg. Co., Ltd.; Asahi Denka Kogyo K. K., all of Tokyo, Japan

[21] Appl. No.: 808,718

[22] Filed: Dec. 17, 1991

[30] Foreign Application Priority Data

Dec. 19, 1990 [JP] Japan ................. 2-403766
Apr. 25, 1991 [JP] Japan ................. 3-095645

[51] Int. Cl.⁵ .................. F25D 17/02; F28D 21/00
[52] U.S. Cl. ................. 165/104.13; 165/104.17; 62/59; 252/70
[58] Field of Search ........... 165/10, 104.17, 104.13; 252/70; 62/59

[56] References Cited

U.S. PATENT DOCUMENTS 3,834,456  9/1974  Clarke et al. ............. 252/70
4,334,412  6/1982  Wildfeuer ............. 165/104.17
4,603,003  7/1986  Van Hook ............. 252/70

FOREIGN PATENT DOCUMENTS

62-192    3/1987  Japan .
214793    8/1990  Japan .

Primary Examiner—Albert W. Davis, Jr.
Attorney, Agent, or Firm—Evenson, McKeown, Edwards & Lenahan

[57] ABSTRACT

A latent heat storage apparatus is provided and a latent heat storage solution therefor stores and retrieves a cool heat substantially in or from a latent heat thereof necessary for air conditioning, cooling, refrigerating, and so forth. The latent heat storage apparatus has an aqueous solution of a plurality of inorganic salts as a latent heat storage solution in a heat storage tank, formed to retrieve a cold heat from a stored latent heat, the latent heat storage apparatus. The latent heat storage solution is formed of $(N-1)$ kinds of inorganic salts in at least an N-component aqueous solution where $N \geq 3$. The latent heat storage solution stores the cold heat as the latent heat thereof. The cold heat is retrievable from the stored latent heat at a desired temperature almost invariably within a range higher than the N-component eutectic point and lower than any one of binary eutectic points of salts with water. The concentration of each inorganic salt in the aqueous solution is represented in a tortuous eutectic plane including ice point of the N-component equilibria diagram, wherein the concentration range allows the cold heat to be retrieved at the specified temperature almost invariably from the latent heat of ice, binary eutectics with water and inorganic salts, or separated substances.

3 Claims, 4 Drawing Sheets

LATENT HEAT STORAGE APPARATUS AND LATENT HEAT STORAGE SOLUTION THEREFOR

BACKGROUND AND SUMMARY OF THE INVENTION

This invention relates to a latent heat storage apparatus and a latent heat storage solution therefor for storing and retrieving a cold heat substantially in or from a latent heat thereof necessary for air conditioning, cooling, refrigerating, and so forth.

Aqueous solutions of ethylene glycol, propylene glycol, calcium chloride, sodium chloride, or the like have been used as cold heat transfer solution, or as so called brine in an evaporation tank of refrigeration cycle system to absorb or evolve the cold heat to a temperature below 0 degree.

If the load which receives the heat with brine of this kind requires a temperature range within strict limits, an ample volume of brine sufficient to moderate the unavoidable temperature fluctuation has to be prepared to keep the temperature constant in the evaporation tank and also at the load site, because the brine or brines store or transfer the cold heat by way of heat capacity of the solution, which heat is referred to hereinafter as kinetic heat which is the opposite of latent heat.

Therefore, a brine tank or the evaporation tank for the system relying on the kinetic heat becomes large in scale to contain the ample brine volume, which is not economic due to increase of the initial installation and running costs.

A technique for latent heat storage apparatus, therefore, has been proposed nowadays to resolve the above problem, wherein a part of the brines is subjected to freezing and thawing so that latent heat is applied to absorb/evolve cold heat. The means for storage of cold heat provides a high density of such heat compared to the means relied on for the kinetic heat, and also an easy evolution of cold heat within a stable range of temperature. The means for cold heat is assembled in a simple and compact system which is widely applied in a field of civil engineering including the food industry.

The latent heat storage apparatus includes two main systems, of which one is so called a capsule system, and other is so called an ice bank system. The former is furnished with a number of capsules piled in a cold heat storage tank, in which capsules enclose inorganic salt solution coinciding with the eutectic composition and the capsules contacting the brine absorb/evolve the cold heat as latent heat. The latter comprises a cold heat storage tank containing brine of inorganic salt or ethylene glycol water solution which is frozen to store cold heat as the latent heat with a cooling tube, wherein the cold heat is retrieved from the frozen solid which evolves the latent heat of fusion.

In the known system, however, having interposed the capsule, the cold heat is transferred in a multistage manner through the cooling tube of the refrigerator, brine and capsule, with the result that the evaporation temperature of the coolant in the refrigerator cooling tube has to be set low so as to reduce the thermal efficiency of the system.

As the capsule is generally formed in ball or cylindrical shape, the capsules piled in the storage tank provide a number of spaces between one another, which, together with some thickness of the wall, inevitably reduce the volumetric density of the latent heat storage solution per unit volume of the storage tank.

Further, the capsule is formed of plastic resin to readily enclose the latent heat storage solution, and thereby to save production cost. The resin wall is thermally less conductive than that of metals. The poor conductivity of the wall in addition to the wall thickness results in a power consumption increase for the refrigerator and in a prolonged processing time consequence to a low operational temperature of refrigerator coolant contacting the capsule.

In the reverse process for retrieving cold heat, the system having disposed the capsule in the thermal passage has to set the storage temperature much lower than the desired retrieving temperature because of the above-mentioned reason, resulting in a less efficient system.

As for the ice bank system, a technique is disclosed in Japanese Laid Open Application No. 62-62192. That document proposes a system furnished with an evaporator comprising a cooling cycle as a heat exchanger in a heat storage tank in which coolant is filled up. The coolant circulates to and from a load. The coolant as a latent heat storage solution is made of two-component inorganic salts solution each of which has an eutectic point below 0 degree respectively, more practically, an aqueous solution of potassium chloride and sodium chloride each of which forms an eutectic with ice and respective salt.

Further, a technique is disclosed in Japanese Laid Open Application No. 2-214793 which proposes to improve further the latent heat storage solution which revolves cold heat at −5 degree during the retrieving process from the latent heat of fusion thereof, which is made of an aqueous solution of potassium nitrate and sodium nitrate.

The first mentioned Japanese document, however, simply refers each of eutectic points for the water-potassium chloride, and the water-sodium chloride, i.e., the binary eutectic points. Because no further technique has been disclosed for the three-component system nor a ternary eutectic point, that document teaches how to retrieve the desired cold heat at a concentration of the solution, without ability to control accurately the temperature in advance.

When the initial concentration of salts in the latent heat storage solution exceeds that of the ternary eutectic, the inorganic salt crystal or salt hydrate separates to deposit in the liquid mixture upon cooling. The salt deposited at the bottom of the heat storage tank is hard to dissolve again in the solution upon heating to evolve the cold heat, due in part to the low temperature of the solution.

In the second mentioned Japanese document, the latent heat storage solution consists of potassium nitrate and sodium nitrate at a specific concentration, wherein the retrievable cold heat is limited at about −5 degrees. The technique further involves a problem as described in the first mentioned Japanese document to separate the nitrate salt upon cooling of the solution, because the concentration range of potassium nitrate includes a range beyond that of the ternary eutectic.

It is a primary object of this invention to provide a latent heat storage apparatus so formed in as to be retrievable a specific cold heat below a temperature of 0 degree almost invariably, in the manner similar to the so called ice bank system.

It is another object of this invention to provide a latent heat storage apparatus and a latent heat storage solution therefor so formed as to be retrievable invariably a cold heat in which temperature is arbitrarily specified easily within a certain range.

The present invention is applicable to a latent heat storage apparatus having a heat storage tank containing latent heat storage solution consisting of a plurality of inorganic salts dissolved in an aqueous solution, wherein cold heat is retrievable from the latent heat storage solution using the latent heat thereof.

A feature of this invention is that the latent heat storage solution is formed as an aqueous solution of N-component mixture of (N−1) kinds of inorganic salts, in which N is at least greater than 3, wherein the concentration of the salts is set in an eutectic tortuous plane including the ice point of liquid-solid equilibrium diagram, wherein the cold heat is stored invariably at an arbitrary temperature in the latent heat storage solution as the latent heat thereof to form ice, binary eutectics with ice, or separated substances in advance, whereby the cold heat is retrievable invariably at the arbitrary temperature in a range above the N-component eutectic point and below any one of binary eutectic points of ice and salts.

It is more preferable to set the concentration of inorganic salts in the solution within a range of concentration 50 to 98 wt. % of that of any one of eutectic lines connecting the ice point and the binary eutectic points with ice and thereof.

It is preferable as well to set the concentration of any one of inorganic salts in a range of 60 to 98 wt. % of that of the binary eutectic point with ice and thereof, and the total concentration of the solution is less than that of the N-component eutectic point.

The apparatus, therefore, achieves the object of the invention by inclusion in a system hereinafter described to store or retrieve the cold heat in or out of the latent heat storage solution by applying the binary eutectics and N-component eutectic included in the N-component tortuous plane.

It is practical to form the system such that the apparatus is connected with the load through circulating tubes to retrieve the cold heat directly from the separated substances which have stored that heat as latent heats thereof, and thereby achieves a preferable thermal efficiency.

The apparatus may be generally formed to dispose a heat exchanger in the latent heat storage tank, wherein coolant circulates in the heat exchanger to work for an evaporator, but the invention is not limited thereto.

The function and effects of the present invention will be described as follow.

Figure 2:
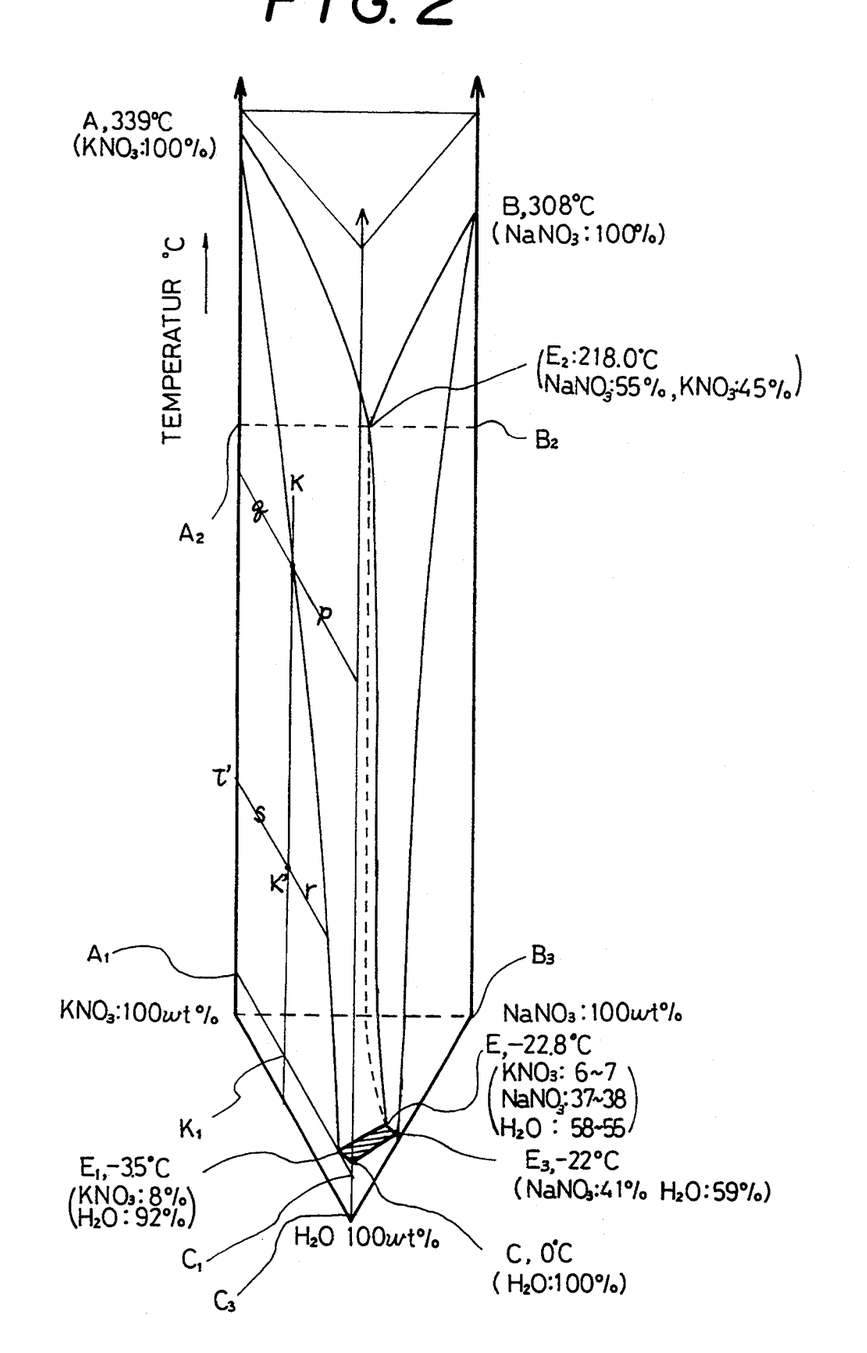
FIG. 2 is a triangular prism diagram illustrating a solid-liquid phase equilibria of three-component aqueous solution embodying the invention.

As described earlier, the latent heat storage solution of this invention consists of an aqueous solution dissolving at least two inorganic salts which forms N-component solution wherein N is greater than 3($N \leq 3$). The concentration of inorganic salts in the latent heat storage solution is set in a range corresponding to that of the ice point, binary eutectic points of the salts with ice, and the N-component eutectic point. If the latent heat storage solution is cooled below the ice point as illustrated in FIG. 2, the solution, which maintains liquid phase for a while because of a depression of freezing point of aqueous solution, commences to separate ice and (N−1) kinds of binary eutectics in the order of higher eutectic point at a definite temperature, namely the freezing point, depending on the composition of the mixture. The solution becomes a two-phase solution consisting of solid (ice and binary eutectics), and liquid (a condensed aqueous solution). As further cooling of the mixture proceeds, the storage solution commences to separate the N-component eutectic until finally a single phase of solid mixture of ice, binary eutectics and N-component eutectic is formed.

The separation process requires a latent heat. The latent heat storage solution absorbs cold heat equivalent to a solidified latent heat of water to form ice, and each one of solidifying latent heats of eutectics to form the corresponding binary eutectics and N-component eutectics.

In the process, therefore, the temperature changes slower compared with that of the single component of water, or even remains unchanged especially during the separation of N-component eutectic at the definite N-component eutectic point.

If, in reverse, the solid mixture of ice and eutectics is heated until it liquefies completely to reach the depressed freezing point, the latent heat storage solution retrieves the cold heat equivalent to the heat of fusion, the reverse of the solidifying latent heat. On further heating, the temperature of the liquid solution is elevated, thereby retrieving the cold heat equivalent to the kinetic heat at the rate of the specific heat of the solution.

Therefore, on comparing the kinetic heat and the latent heat with respect to a unit weight, the latter is generally much greater than the former. In the state in which both solid and liquid exist, that is the state of ice+eutectics+liquid solution, the cold heat is retrievable from the latent heat of fusion which ice and eutectics release.

Further, because the N-component eutectic point is lower than every binary eutectic point, it is possible to set arbitrarily the temperature to retrieve the cold heat within a range between any one of the freezing points and the N-component eutectic point by suitable preparation of the composition and the initial concentration of the solution of inorganic salts.

And further, it is possible to maintain a ratio of ice and eutectics to the aqueous solution, or an ice packing factor (IPF in short, hereinafter) of more than 30%, because the concentration of the inorganic salts in the latent heat storage solution is set in the range of 50 to 98 wt. % of that equivalent to the eutectic line connecting any one of the binary eutectic points with water and the N-component eutectic point.

It is possible as well to avoid separation of the crystal salts or hydrates thereof during the cold heat storage process, because the concentration of any one of inorganic salts is set in a range of 60 to 98 wt. % of that of the binary eutectic point with ice and thereof, and the total concentration of the solution is less than that of the N-component eutectic point, whereby one need not worry about the dissolving speed of the crystal salts and hydrates in the cold heat retrieval process, because there is no such solid which may pile at the bottom of the heat storage tank.

Because the range of concentration of the salts in the latent heat storage solution is set, the solid-liquid phase tortuous plane including the ice point and the N-component eutectic point shows a gradual slope compared with a steep slope of the remaining solid-liquid tortuous planes which include the melting points of any couple of inorganic salts and the N-component eutectic point. Thus, the cold heat can be efficiently stored or evolved invariably at any temperature within the range between the depressed freezing point and the N-component eutectic point depending on the composition and initial concentration, thereby maintaining the maximum IPF at the desired ratio.

Comparing the slope of solid-liquid line connecting the ice point and each of the binary eutectic points with that of lines connecting the binary eutectic point next to the ice point and the N-component eutectic point at the rather higher part below the ice point, the latter are in most cases more gradual than the former. In using the latent heat of water alone in the two-component system, the cooling heat is advantageously retrievable invariably by forming the ice+binary eutectics with ice within the appropriate IPF.

In this invention, therefore, it is possible to supply the cold heat to the load at the freezing point as desired within the temperature range below the binary eutectic point with ice above the N-component eutectic point, in which the freezing point is arbitrarily set with the composition and concentration of the (N−1) kinds of inorganic salts of the latent heat storage solution as to the N-component aqueous solution filled in the heat storage tank, wherein N is greater than three (N≧3).

In this present invention, because the cold heat is stored in or retrieved from the latent heat storage solution utilizing the binary and N-component eutectics in the N-component tortuous plane which enables arbitrary selection of the freezing or fusion points, the cold heat is stably retrievable with almost invariable temperature.

It is further possible in this invention to save a loss of thermal energy, and to raise the thermal efficiency of the latent heat storage apparatus, because the latent heat of separated substances, the binary or N-component eutectics, is directly exchangeable to the cold heat at the load site.

A solid-liquid line also represents a solubility curve corresponding to respective temperatures. Therefore, concentration of the binary eutectics in the N-component tortuous plane, in which temperature is above N-component eutectic point, is smaller than the saturated concentration, that is, that of N-component eutectic. During the retrieval process of cold heat from the latent heat, the binary eutectics can dissolve in the liquid at a faster rate without depressing the rate of the retrieval process. The faster dissolving rate, therefore, enables a much longer duration for at an invariable fusion point, because the eutectics dissolve without a time lag corresponding to the rate of process without raising the fusion point.

DETAILED DESCRIPTION OF THE PREFERRED EMBODIMENT

Unless otherwise specified, sizes, materials, shapes, relative arrangements, etc. of the constitutional parts described for the embodiments described herein are not intended to limit the scope of the invention thereto, but are merely illustrative.

Figure 1:
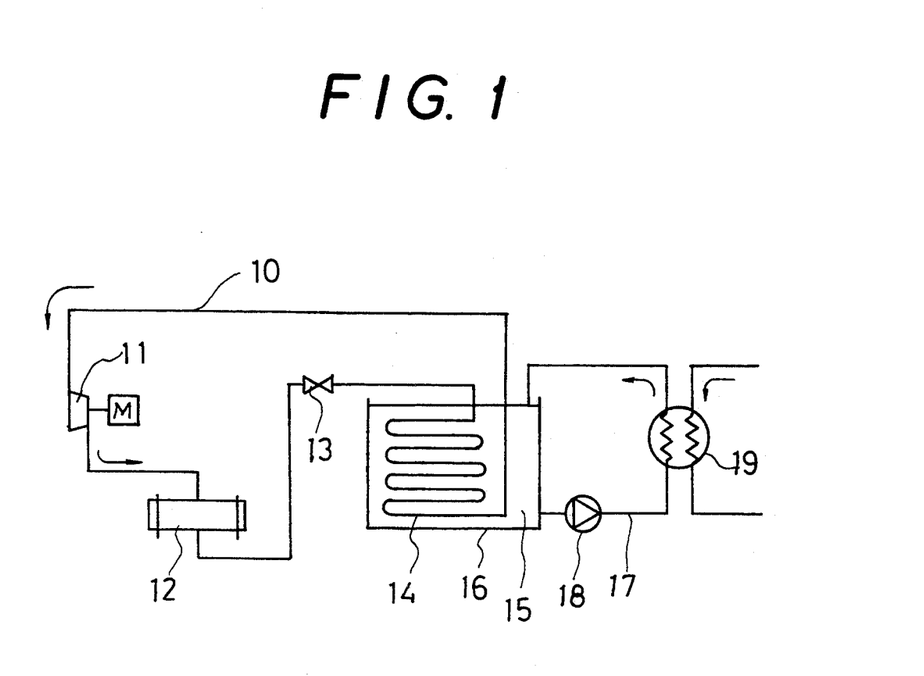
FIG. 1 is a schematic diagram illustrating a latent heat storage apparatus as an evaporator of refrigeration cycle embodying the invention.

In FIG. 1, numeral 11 is a compressor driven by an engine M. The outlet of the compressor 11 is connected with a condenser 12. The condenser 12 is led to a heat storage tank 16 through an expansion valve 13 connected with a heat exchanger 14 wound in a coil and acting as an evaporator disposed in the heat storage tank 16. The outlet of the heat exchanger 14 is connected with the inlet of compressor 11, which forms a conventional refrigeration cycle or system 10.

The heat storage tank 16 containing the heat exchanger 14, is filled with a latent heat storage solution 15, such as an aqueous solution of inorganic salts. The latent heat storage solution 15 is able to circulate with a load through a circulation passage 17 which connects in sequential order the heat storage tank 16, a pump 18, and a heat exchanger 19, and returns to the heat storage tank 16.

TABLE 1 shows general information relating to a three-component aqueous solution of potassium nitrate ($KNO_3$)-sodium nitrate ($NaNO_3$)-water ($H_2O$) on concentration of eutectics, eutectic points, and melting points of component inorganic salts. FIG. 2 is a triangular prism diagram illustrating a solid-liquid phase equilibria of the three-component aqueous solution embodying the invention. Before describing examples of the latent heat storage solution 15 which are aqueous solutions of potassium nitrate and sodium nitrate, the three-component system in different concentrations, general information on the three-component system will be described as follow.

In the prism illustrating the solid-liquid phase equilibria as shown in FIG. 2, the prism has an equilateral triangle base with vertical edge lines in which the concentration of each component is 100 wt. % at the respective corner edges of the triangle, and the temperature of the system is graduated along the vertical edge lines. Points A, B and C represent melting points of the respective elements, potassium nitrate, sodium nitrates and water. Points $E_1$, $E_2$ and $E_3$ are the respective binary eutectic points, $KNO_3$—$H_2O$, $KNO_3$—$NaNO_3$, and $NaNO_3$—$H_2O$. Those temperatures and concentrations are shown in TABLE 1 below.

TABLE 1

| LETTERS FOR EUTECTICS | CONCENTRATION OF EUTECTICS (wt. %) | | | EUTECTIC POINTS (°C.) |
| --- | --- | --- | --- | --- |
| | $KNO_3$ | $NaNO_3$ | $H_2O$ | |
| $E_1$ | 8 | — | 92 | −3.5 |
| $E_2$ | 45 | 55 | — | 218.0 |
| $E_3$ | — | 41 | 59 | −22.0 |
| E | 6–7 | 37–38 | 57–55 | −22.8 |

Ta: Melting Point of $KNO_3$ is 339° C.,
Tb: Melting Point of $NaNO_3$ is 308° C., and
Tc: Melting Point of $H_2O$ is 0° C.

Each vertical face of prism illustrates a two-component system, as shown in FIG. 2; thus for potassium-water system, the curve $AE_1$ represents the conditions of temperature under which liquid phase is in equilibrium with the solid phase of potassium nitrate of which initial concentration of the nitrate is 8 to 100 wt. % in the solution, wherein the nitrate commences to separation below the solid-liquid line upon cooling; the curve $CE_1$ represents the solid-liquid line of which initial concentration nitrate is in a range of 0 to 8 wt. % below which temperature the ice commences to separate on cooling. The temperature-concentration areas surrounded with both the solid-liquid line and the isothermal line $A_1E_1C_1$ horizontal with the binary eutectic point $E_1(-3.5°$ C.) represent the regions where solid and liquid solution exists, that is, the nitrate crystal+liquid solution, and the ice+liquid solution, respectively. On further cooling below the isothermal line $A_1E_1C_1$, no more liquid solution can exist, but only solid mixtures of the nitrates+eutectic, and ice+eutectic respectively.

The vertical line $KK'K_1$ represents the cooling line of the nitrate with a concentration of $[p/(p+q)]$ along which the nitrate follows upon cooling. It is known that a cross point $K'$ of the cooling line $KK'K_1$ and the isothermal line of the temperature of $t'$ parallel to the line $A_1E_1C_1$ represents the gravimetric ratio of the nitrate and the liquid solution at the temperature of $t'$, that is, at the ratio of distance r between the cross point and the solid-liquid line, and distance s between the cross point $K'$ and the vertical edge. In other words, the solid-liquid line represents a solubility curve of the nitrate at different temperatures.

Similarly, the solid-liquid line $CE_1$ represents the gravimetric ratio of ice and liquid solution of which nitrate concentration is more dilute than that of eutectic $E_1$.

For a potassium nitrate-sodium nitrate system, lines $AE_2$, $BE_2$ represent the boundary lines where the nitrates and liquid solution exists. For a sodium nitrate-water system, lines $BE_3$, $CE_3$ are the boundary lines where the nitrate-liquid solution and ice-liquid solution exist.

Further, a curve $E_1E$ represents the solid-liquid line of separated substance(s)-eutectic $E_1$-liquid solution of the three-component system, wherein the separated substances are the nitrates when the inorganic solution is more rich in the salts than that of the solid-liquid line $E_1E$, and the separated substance is ice when the solution is poorer in salts.

Similarly, a curve line $E_3E$ represents the solid-liquid line of separated substance(s)-eutectic $E_3$-liquid solution of which separated substance(s) corresponds to the above.

Further, at the temperature below the three-component eutectic point E, the system reveals the solid phase, that is, a mixture of separated substance(s)-ternary eutectic E, of which separated substance(s) is either one of or mixture of salt crystals, ice, binary eutectic $E_1$, and/or $E_2$.

Strictly speaking, because an aqueous solution of salts can not exist above the boiling point of about 100° C. at atmospheric pressure, the solid-liquid lines of the aqueous solution are imaginary which may appear as real lines at an elevated pressure and are useful for grasping the idea.

Turning back to the ternary eutectic point E, as shown in FIG. 2, the ternary eutectic point E is $-22.8°$ C. or approximately $-23°$ C. If the concentration of the three-component system is within a tortuous plane including the ternary eutectic point E, the binary eutectic point $E_1$, the ice point C, and the binary eutectic point $E_2$, the cold heat can be stored until the ternary eutectic point E of $-23°$ C. with a desired IPF as a latent heat of the solids such as ice, the binary eutectics $E_1$ and $E_2$ upon cooling.

Upon choosing preferably the inorganic salts and the concentration, the temperature at which a solid firstly commences to separate on cooling can be set arbitrarily as desired, in which the temperature is called as freezing point hereinafter.

In TABLE 2, characteristics of examples of the latent heat storage solution 15 are shown therein. The examples 1, 2 and 3 were prepared with freezing points of $-5°$, $-11°$ and $-22°$ C., respectively.

TABLE 2

| LATENT HEAT STORAGE SOLUTION | FREEZING POINT (°C.) | CONCENTRATION OF SALTS (wt. %) | | LATENT HEAT (kcal/g) |
| --- | --- | --- | --- | --- |
| | | $KNO_3$ | $NaNO_3$ | |
| EXAMPLE 1 | −5 | 7 | 8 | 72 |
| EXAMPLE 2 | −11 | 8 | 20 | 65 |
| EXAMPLE 3 | −23 | 6 | 37 | 60 |
| where water fills the rest part. | | | | |

Figure 3:
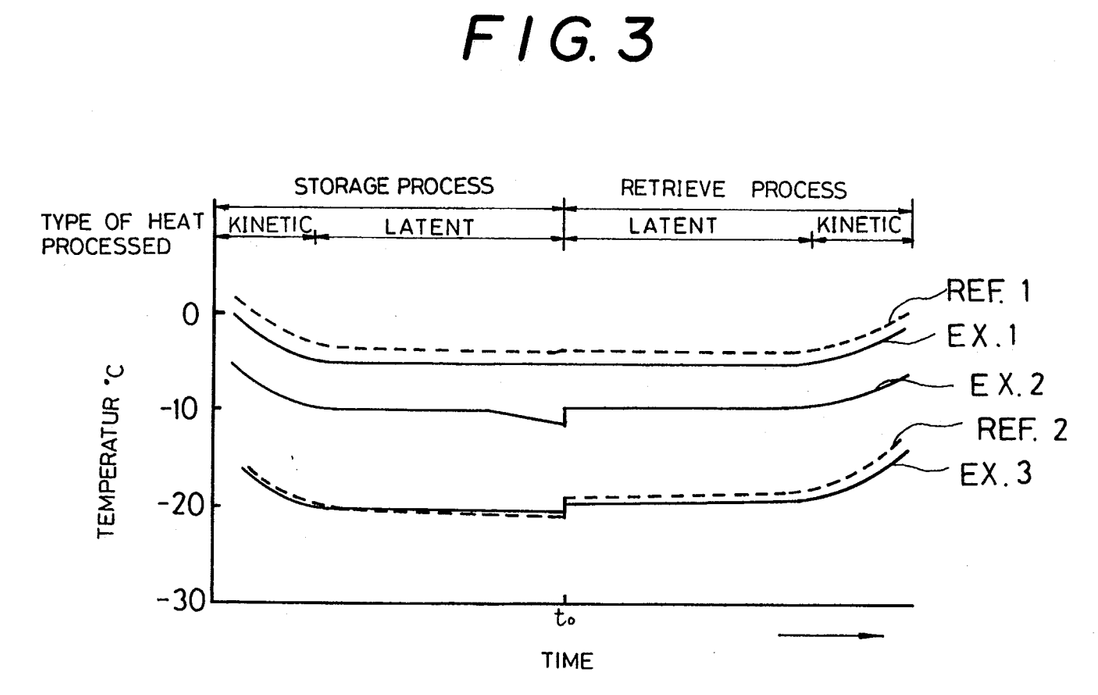
FIG. 3 is a temperature-time diagram illustrating the freezing and fusion curves of a latent heat storage solution described later in TABLE 3.

FIG. 3 is a temperature-time diagram illustrating the freezing and fusion curves of a latent heat storage solution described in TABLE 3. The storage/retrieval process in the refrigeration cycle 10 with the Example 1 as the latent heat storage solution 15 will be described as follow.

Firstly, to store the cold heat in the latent heat storage solution 15 contained in the heat storage tank 16, the refrigeration cycle 10 was commenced to compress a primary coolant gas including organic fluorides via the compressor 11. The compressed coolant gas was then led to condenser 12 to be cooled and liquefied. The pressure of the liquefied coolant was then reduced via the expansion valve 13 so that cold primary coolant was led to the heat exchanger 14.

Secondly, the cold heat of the primary coolant was transferred through the heat exchanger 14 to the latent heat storage solution 15. The exchanged primary coolant was finally returned to the compressor 11 to form a primary cycle.

Thirdly, the chilled Example 1 latent heat storage solution 15 did not separate ice even below the ice point of 0° C. due to the depression effect of salt solution, but until it reached the freezing point of $-5°$ C. where the Example 1 solution crossed the tortuous solid-liquid plane $CE_1EE_3$ shown in FIG. 2 to commence separately solid substances, firstly ice and then the binary eutectic $E_1$.

The Example 1 latent heat storage solution 15, as shown in FIG. 3, absorbed the cold heat for storage in the form of freezing latent heat of 72 kcal/g. The storage process in the heat storage tank 16 finished before the latent heat storage solution 15 had reached at the ternary eutectic point E with the IPF of 30 to 80%.

Lastly, the pump 18 was started to circulate the latent heat storage solution 15 together with the separated solid from the heat storage tank 16 to the heat exchanger 19 through the circulation passage 17 to retrieve the cold heat. Because the latent heat storage solution 15 was kept almost constant at the fusion temperature of −5° C. expelling cold heat with the fusion latent heat of 72 kcal/g, as shown in FIG. 3, the cold heat of −5° C. could be transferred to a tertiary coolant in the heat exchanger 19.

In the Example 2 latent heat storage solution 15 applied in the refrigeration cycle 10, as shown in FIG. 3, the cold heat was stored in the heat storage tank 16 as was the case in Example 1 in which cold heat was retrieved at the almost constant temperature of −11° C. from the latent heat of 65 kcal/g of the latent heat storage solution 15. The tertiary coolant in the heat exchanger 19 could receive the cold heat at the temperature of −11° C.

Because the storage process was finished before reaching at the IPF of 100%, 50% for example, the latent heat storage solution 15 could not reach to the ternary eutectic point E in the solid-liquid equilibrium plane $CE_1EE_3$, wherein the cold heat was retrievable substantially from the latent heat of the binary eutectic $E_1$ maintaining the fusion temperature unchanged.

Because the IPF was kept below 100%, or at least a part of the latent heat storage solution 15 remained as a liquid solution, the liquid storage solution 15 could be circulated directly to the heat exchanger 19 of the load, whereby a temperature difference between the heat storage tank 16 and an intended temperature of substance to be cooled, with reduced heat loss in the refrigeration cycle 10 could be reduced the heat loss, can be obtained with a high energy efficiency.

Further, in the Example 3 latent heat storage solution 15 applied in the refrigeration cycle 10, as shown in FIG. 3, the cold heat was stored in the heat storage tank 16 as was in Examples 1 and 2 in which cold heat was retrieved at the almost constant temperature of −23° C. from the latent heat of 60 kcal/g of the latent heat storage solution 15. The tertiary coolant in the heat exchanger 19 could receive the cold heat at the temperature of −23° C.

Because the concentration of the Example 3 solution corresponded to that of the ternary eutectic point E, the retrievable temperature of cold heat was the only one, that is, the ternary eutectic point E, which allowed an IPF as large as nearly 100%.

Further in the retrieval process of the Example 3 latent heat storage solution 15, the dissolving speed of the ternary eutectic E was fast enough to respond to the fluctuation of load at the heat exchanger 19, because the concentration of potassium nitrate and sodium nitrate was smaller than the saturated concentration.

In FIG. 3, curved lines representing the storage/retrieval process with the refrigeration cycle 10 for dashed Reference lines 1 and 2 are shown for reference compositions in which each of the salt concentrations in the aqueous solution thereof was 8.5 wt. % of $KNO_3$ corresponding to the binary eutectic $E_1$, and 39 wt. % of $NaNO_3$ corresponding to the binary eutectic $E_2$, respectively.

Following is a description of Examples 11 through 14. TABLE 3(a) shows composition of inorganic salts in wt. % for the Examples 11 through 14 and some References. TABLE 3(b) shows several eutectic points for the system relating to Examples 11 through 14.

TABLE 3(a)

| COMPOSITION OF EXAMPLES in wt. % | | | | | |
|---|---|---|---|---|---|
| EXAMPLE | $KNO_3$ | $NaNO_3$ | KCl | NaCl | $NH_4Cl$ |
| EX. 11 | 4 | 35 | | | |
| EX. 12 | | | 17 | 4 | |
| EX. 13 | | | 4 | 20 | |
| EX. 14 | | | 3 | 20 | 10 |
| REF. 11 | | 41 | | | |
| REF. 12 | | | | 24 | |
| REF. 13 | | | 21 | | |
| where water fills the rest part. | | | | | |

TABLE 3(b)

| CONCENTRATION OF EUTECTICS RELATING TO EXAMPLES 11-14 | | | | | |
|---|---|---|---|---|---|
| SOLUTION | $KNO_3$ | $NaNO_3$ | KCl | NaCl | EUTECTIC POINT °C. |
| $KNO_3$—$NaNO_3$—$H_2O$ | 6-7 | 37-38 | | | −22.8 |
| $KCl$—$NaCl$—$H_2O$ | | | 6 | 21 | −22 |
| $KNO_3$—$H_2O$ | 8 | | | | −3.5 |
| $NaNO_3$—$H_2O$ | | 41 | | | −22 |
| $KCl$—$H_2O$ | | | 21 | | −11 |
| $NaCl$—$H_2O$ | | | | 24 | −21 |
| $NH_4Cl$—$H_2O$ | | | ($NH_4Cl$:29) | | −15 |
| where water fills the rest part. | | | | | |

The composition of the latent heat storage solution 15 was prepared to have a first inorganic salt constituting the larger part of the salts and so selected among the salts that the binary eutectic point of the first inorganic salt with ice was close to the temperature of desired cold heat. The concentration of the first inorganic salt was arranged within a range of more than 60 wt. % and less than 98 wt. % of that of the binary eutectic.

Secondly, the concentration of the second inorganic salt was subordinated to that of the first inorganic salt. The total content of the first and second inorganic salts was arranged to be less than that of the ternary eutectic.

Thirdly, in case of adding the third inorganic salt in the latent heat storage solution, the content of the third salt was subordinated to that of the first and second salts. The total content of the salts was arranged to be less than that of the quaternary eutectic, whereby the process was assured to retrieve the cold heat and not be hindered with an excess of salt beyond the concentration of the eutectic.

Figure 4:
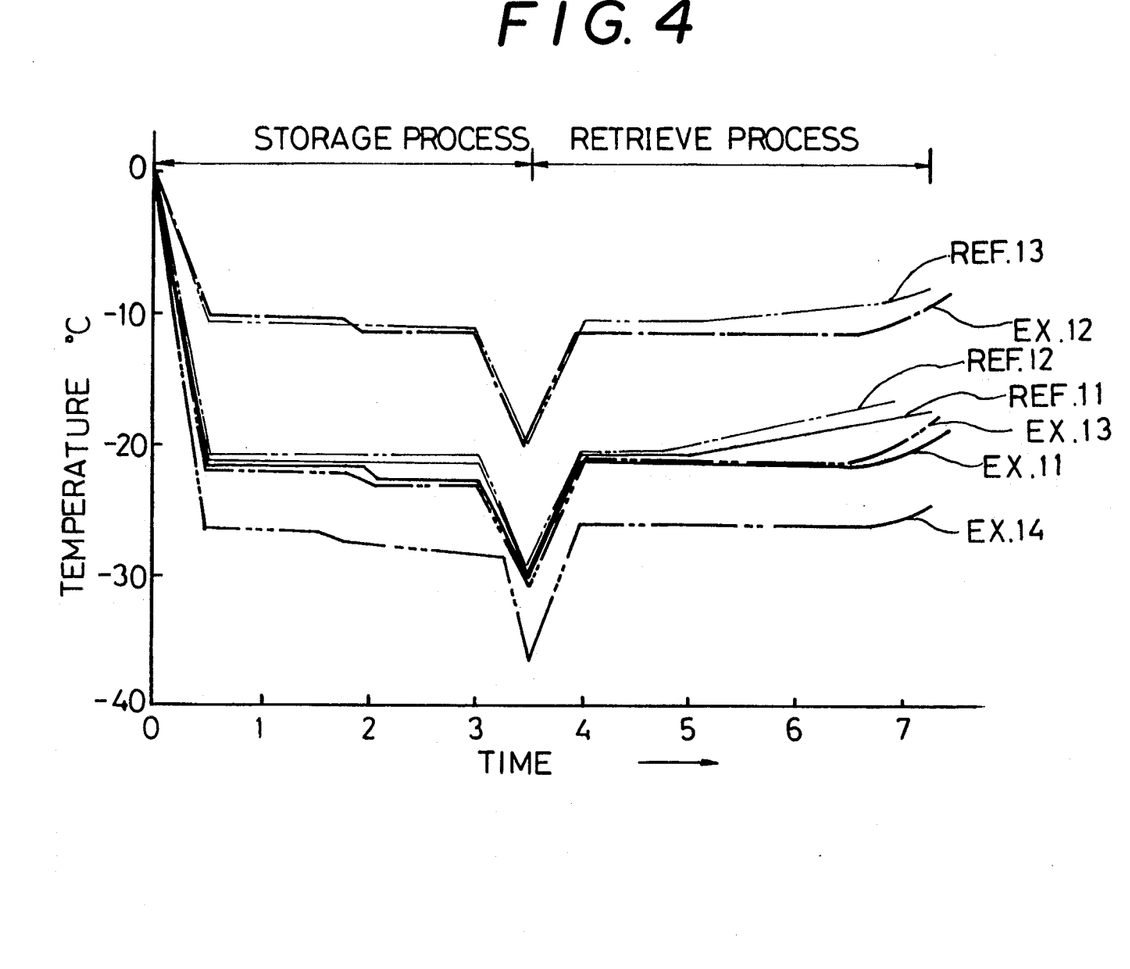
FIG. 4 is a characteristic diagram illustrating the freezing and fusion curves of a latent heat storage solution shown in TABLE 4.

FIG. 4 is a characteristic diagram illustrating the freezing and fusion curves for the Examples and References of the latent heat storage solution shown in TABLE 4, below wherein the freezing/fusion latent heats were utilized for storing/retrieving the cold heat.

In FIG. 4 and TABLE 4, a dwelling or staying time at fusion temperature is defined as a period (hrs.) required to raise the temperature of solution by 1° C. from the temperature of starting to retrieve the cold heat.

Inorganic salts for the latent heat storage solution 15 such as sodium chloride and ammonium chloride other than those described earlier have been utilized as the components of three-component system. In the three-component system, a freezing point of −25° C. was available, in which each concentration of salts in the aqueous solution was provided as 20 wt. % of sodium chloride, and 15 wt. % of ammonium chloride, respectively. The tertiary coolant in the heat exchanger 19 thus made it possible to receive the cold heat of −25° C.

An aqueous solution of a four-component system may be used as the latent heat storage solution 15, comprising a mixture of sodium nitrate, $NaNO_3$, and ammonium chloride $NH_4Cl$ each of which has no common anion.

The reason why the system is deemed a four-component solution with the two salts is as follows. In the system with salts which possess no common anion, there is a possibility of dissociation/recombination of the salts in the aqueous solution, thus, forming extra salts such as NaCl and $NH_4NO_3$. Among the four salts, NaCl may be bound as $xNaNO_3 + yNH_4Cl - zNH_4NO_3$. The system, therefore, is specified by four components, e.g., $NaNO_3$, $NH_4Cl$, $NH_4NO_3$ and $H_2O$.

In the four-component system with a nominal concentration of 30 wt. % of sodium nitrate, and of 7 wt. % of ammonium chloride, a freezing point of −29° C. was available, of which cold heat was transferred to the tertiary coolant in the heat exchanger 19.

The Reference 11 through 13 solutions were binary eutectics of sodium nitrate, sodium chloride and potassium chloride relating to the Examples 11-14. FIG. 4 and TABLE 4 also show the behaviors of the References 11-13 in the storage/retrieval process utilizing the latent heat thereof.

The Example 13 latent heat storage solution 15 was an aqueous solution of potassium chloride and sodium chloride. The concentration in the aqueous solution of the first inorganic salt was 20 wt. % of sodium nitrate in which concentration was 88% of binary eutectic.

It was found that the solution started to freeze at a temperature of −22.0° C., and a latent heat thereof was 56 kcal/g. The cold heat was retrieved at a temperature of −21.0° C. and remained invariable at a temperature of about −20° C. for 2.5 hrs.

The Example 14 latent heat storage solution 15 was an aqueous solution of potassium chloride, sodium chloride and ammonium chloride. The concentration in the aqueous solution of the first inorganic salt was 20 wt. % of sodium chloride in which concentration was 96% of binary eutectic.

It was found that the solution started to freeze at a temperature of −26.5° C., and a latent heat thereof was 61 kcal/g. The cold heat was retrieved at a temperature of −26.0° C. and remained invariable at a temperature of about −26° C. for 2.5 hrs.

The example solutions were at least the three-component aqueous solution including two inorganic salts or more. In the retrieval process of cold heat when the separated solids mainly consisted of ice and frozen binary eutectics dissolved in the liquid solution, therefore, the temperature gradient could be depressed with less change of concentration of inorganic salts in the solution.

The time staying at the fusion temperature, therefore, to retrieve cold heat from the latent heat with invariable temperature can be made to last longer than that of the References 11 through 13 of solutions of inorganic salts.

Because the total concentration of inorganic salts in

TABLE 4

| LATENT HEAT STORAGE SOLUTION | CHARACTERISTICS OF EXAMPLES | | | |
|---|---|---|---|---|
| | STARTING TEMPERATURE OF FREEZING (°C.) | STARTING TEMPERATURE OF RETRIEVE (°C.) | LATENT HEAT (kcal/g) | STAYING TIME AT FUSION (hrs.) |
| EX. 11 | −21.7 | −21.2 | 62 | 2.6 |
| EX. 12 | −10.3 | −9.1 | 55 | 2.6 |
| EX. 13 | −22.0 | −21.0 | 56 | 2.5 |
| EX. 14 | −26.5 | −26.0 | 61 | 1.0 |
| REF. 11 | −21.5 | −20.6 | 62 | 1.0 |
| REF. 12 | −21.5 | −20.5 | 56 | 0.9 |
| REF. 13 | −10.5 | −10.2 | 63 | 0.9 |

The Example 11 latent heat storage solution 15 was an aqueous solution of potassium nitrate and sodium nitrate. The concentration in the aqueous solution of the first inorganic salt was 35 wt. % of sodium nitrate of which concentration 88% was that of binary eutectic.

It was found that the solution started to freeze at a temperature of −21.7° C., and a latent heat thereof was 62 kcal/g. The cold heat was retrieved at a temperature of −21.2° C. and remained invariable at a temperature of about −21° C. for 2.6 hrs.

The Example 12 latent heat storage solution 15 was an aqueous solution of potassium chloride and sodium chloride. The concentration in the aqueous solution of the first inorganic salt was 17 wt. % of potassium chloride in which concentration was 86% of binary eutectic.

It was found that the solution started to freeze at a temperature of −10.3° C., and a latent heat thereof was 55 kcal/g. The cold heat was retrieved at a temperature of −9.1° C. which remained invariable at a temperature of about −9° C. for 2.6 hrs.

the solution was restricted not to exceed that of the system eutectic, the separation of salts or hydrates thereof was prohibited during the storage process of cold heat.

Further because the dissolving speed of ice and eutectics into the cold solution during the retrieval process was faster than that of salts and hydrates thereof, the temperature of the fusing solution could be kept fairly constant.

During the retrieval process, therefore, the cold heat was retrievable stably from the latent heat from the separated substances at the specific temperature for a long time with a good efficiency.

If the concentration of the first inorganic salt which primarily determines the retrieval temperature of cold heat was less than 60% of that of the binary eutectic, the temperature of the solution varied widely during the retrieval process and failed to retrieve invariably the cold heat at the desired temperature.

If the concentration of the first inorganic salt was more than 98% of that of the binary eutectic, because the dissolving speed of separated inorganic salt crystals was slow, the crystals remained undissolved in the liquid solution during the retrieval process. Therefore, the time for retrieving the cold heat from the latent heat at the desired temperature became shorter.

Therefore, the concentration of the first inorganic salt should be within a range more than 60% and less than 98%, or more preferably in a range of 70 to 90%, of the binary eutectic. In the solutions of Examples 13 and 14, for example, the concentration of the first inorganic salt, sodium chloride, in the aqueous solution will be in a range of 14.4 to 23.5 wt. %, or more preferably in a range of 16.6 to 21.6 wt. %.

The latent heat storage solution 15 may additionally contain rust inhibitors, fungicides, and so forth, if necessary.

What is claimed is:

1. A freezing cycle latent heat storage apparatus, comprising a compressor, a condenser operatively connected with said condenser, a heat storage tank, expansion valve operatively arranged between said condenser and said heat storage tank and an evaporator operatively arranged as a heat exchanger in said heat storage tank wherein said heat storage tank is communicated with a load via a circulation path, and a latent heat storage material in the form of an aqueous solution is stored in said heat storage tank, said latent heat storage material being an N ($N \geq 3$) component system consisting of (N−1) inorganic salts with an eutectic point of no greater than −10° C., and water, the eutectic concentration of one of said inorganic salts being in a range of 60 to 98%.

2. The latent heat storage apparatus according to claim 1, wherein said latent heat storage material is a three component system having two different inorganic salts with common anions.

3. The latent heat storage apparatus according to claim 1, wherein said latent heat storage material is a four component system having two different inorganic salts which do not contain a common anion.

* * * * *